US009452636B2

(12) United States Patent
Russo

(10) Patent No.: US 9,452,636 B2
(45) Date of Patent: Sep. 27, 2016

(54) CONVERTIBLE STRETCHED CANVAS FOR ARTISTS

(76) Inventor: Lisa Russo, Ocklawaha, FL (US)

( * ) Notice: Subject to any disclaimer, the term of this patent is extended or adjusted under 35 U.S.C. 154(b) by 221 days.

(21) Appl. No.: 12/384,690

(22) Filed: Apr. 8, 2009

(65) Prior Publication Data

US 2010/0260961 A1 Oct. 14, 2010

(51) Int. Cl.
*B32B 3/14* (2006.01)
*B44D 3/18* (2006.01)

(52) U.S. Cl.
CPC .............. *B44D 3/185* (2013.01); *Y10T 428/16* (2015.01)

(58) Field of Classification Search
CPC ........... B44D 3/18; B44D 3/185; G09F 1/06; Y10T 428/18
USPC .............. 428/54, 80; 160/377, 374.1, 229.1; 40/733, 603, 729
See application file for complete search history.

(56) References Cited

U.S. PATENT DOCUMENTS

| | | | | |
|---|---|---|---|---|
| 3,267,597 | A | 8/1966 | Jannes | |
| 3,332,178 | A * | 7/1967 | Foster | 52/70 |
| 3,871,143 | A * | 3/1975 | Quick | 52/309.1 |
| 5,887,373 | A | 3/1999 | Byers | |
| 6,427,371 | B2 | 8/2002 | Olson | |
| 6,467,209 | B1 | 10/2002 | Vickers | |
| 6,637,139 | B1 | 10/2003 | Chan | |
| D508,535 | S | 8/2005 | Koseck | |
| D552,851 | S | 10/2007 | Abrahamian | |
| 7,395,621 | B2 | 7/2008 | Carter | |
| 2007/0080960 | A1 | 4/2007 | Dayanand | |

* cited by examiner

*Primary Examiner* — Alexander Thomas
(74) *Attorney, Agent, or Firm* — Patents on Demand P.A.; Brian K. Buccheit; Scott M. Garrett

(57) ABSTRACT

A multi-panel stretched canvas for artists which is capable of being selectively converted from a 2-dimensional configuration suitable for mounting on a vertical surface such as a wall, for instance, to a plurality of 3-dimensional configurations suitable for mounting on a vertical surface as a bas relief-like wall hanging or resting on a horizontal surface such as a table, for instance. The apparatus in its simplest sense is comprised of three panels of stretched canvas, each in the shape of an equilateral triangle, arranged in a specific configuration and joined together in series by pivotable connection means, preferably hinges. In 2-D form, the panels together form a trapezoid which may be wall mounted in the traditional fashion. By rotating the two end panels a distance behind the center panel the apparatus forms a 3-D bas relief like structure which when mounted to a vertical surface has three sides of the trapezoid in contact with the vertical surface. By rotating the two end panels further until their top edges contact each other, the apparatus forms a pyramid shape having a hollowed trilateral base and is suitable for display on a horizontal surface. Each panel is comprised of a triangular stretcher to which a linen or cotton canvas is mounted in conventional fashion.

20 Claims, 6 Drawing Sheets

CONVERTIBLE STRETCHED CANVAS FOR ARTISTS

FIELD OF THE INVENTION

The subject invention relates generally to a support medium for oil painting and the like, and more particularly to an artist's canvas which is capable of conversion from 2-dimensional to 3-dimensional form.

BACKGROUND OF THE INVENTION

Canvas is an extremely heavy-duty plain-woven fabric popularly used as a painting surface. It comes in two basic types: plain and duck. The threads in duck canvas are more tightly woven. In the United States, canvas is classified in two ways: by weight (ounces per square yard) and by a graded number system. The numbers run in reverse of the weight; so a number 10 canvas is lighter than number 4.

Canvas is typically made of one of two materials; linen or cotton, the former being derived from the flax plant and the latter from the cotton plant. Early canvas was made of linen, a sturdy brownish fabric of considerable strength. Linen is particularly suitable for the use of oil paint and is composed of higher quality material than cotton, and remains popular with many professional artists, especially those who work with oil paint.

In the early 20th century, cotton canvas, often referred to as "cotton duck", came into use and is now the more common type used today. It differs from other heavy cotton fabrics, such as denim, in being plain weave rather than twill weave. Cotton duck, which stretches more fully and has an even, mechanical weave, offers a more economical alternative. The advent of acrylic paint has greatly increased the popularity and use of cotton duck canvas.

As alluded to above, canvas is typically stretched across a wooden frame called a stretcher, and may be coated with gesso before it is to be used; this is to prevent oil paint from coming into direct contact with the canvas fibers, which will eventually cause the canvas to decay. The stretcher is constructed of a plurality of interlocking stretcher bars. Unlike other types of frames, the corner joints in stretcher bars are not glued or fastened in any permanent way. This allows the canvas to be retensioned over time, as it has a natural tendency to stretch and sag over time. In contrast, strainer bars stretch canvas in a fixed (non-adjustable) way. Once constructed, a stretcher is usually in the shape of a rectangle, although shaped canvases are also possible.

Regardless of the shape of its perimeter, a stretched canvas is traditionally a planar structure intended for flush wall mounting. Although 3-dimensional objects often serve as a substrate for paint, the prior art is devoid of any stretched canvas structure that can serve as a substrate for both 2-dimensional and 3-dimensional artwork suitable for display on both vertical and horizontal surfaces such as a wall and table, respectively. While 2-dimensional art can be observed in its entirety from a single vantage point and at a single moment in time, the beauty of 3-dimensional art is that it cannot be. Rather, it must be studied over time and in portions through movement of either the art or the observer. That 3-dimensional art cannot be seen in its entirety in a single moment adds to its intrigue. It is therefore desirable to have an art support medium that is convertible from 2-dimensional to 3-dimensional form such that the art created thereon may be displayed and appreciated in both states at the owner's discretion.

The following additional U.S. patents and applications relating to folding displays and the like are incorporated herein by reference: U.S. Pat. No. 6,467,209 entitled Overhead Media Display System; U.S. Pat. No. 3,267,597 entitled Hollow Foldable Display; U.S. Pat. No. 6,427,371 entitled Picture Frame; 20070080960 entitled Workflow System for 3D Model Creation; U.S. Pat. No. 7,395,621 entitled Flat Folding Promotional Structure; U.S. Pat. No. 5,887,373 entitled Card Display Frame; U.S. Pat. No. 6,637,139 entitled Hingedly Articulated Image Display panel Device; D552,851 entitled Folding Mirror; and D508,535 entitled Sign System. None of these references teach or suggest a stretched canvas substrate for art media such as oil paints and acrylics which said substrate is selectively convertible from a 2-dimensional to 3-dimensional form.

All patents, patent applications, provisional applications, and publications referred to or cited herein, or from which a claim for benefit of priority has been made, are incorporated herein by reference in their entirety to the extent they are not inconsistent with the explicit teachings of this specification.

SUMMARY OF THE INVENTION

In order to meet the need in the art, the subject convertible stretched canvas for artists has been created. At least one preferred embodiment of the invention is discussed below.

The present invention relates to a multi-panel stretched canvas for artists which is capable of being selectively converted from a 2-dimensional configuration suitable for mounting on a vertical surface such as a wall, for instance, to a plurality of 3-dimensional configurations suitable for mounting on a vertical surface as a bas relief-like wall hanging or resting on a horizontal surface such as a table, for instance. The apparatus in its simplest sense is comprised of three panels of stretched canvas, each in the shape of an equilateral triangle, arranged in a specific configuration and joined together in series by pivotable connection means, preferably hinges. In 2-D form, the panels together form a trapezoid which may be wall mounted in the traditional fashion. By rotating the two end panels a distance behind the center panel the apparatus forms a 3-D bas relief like structure which when mounted to a vertical surface has three sides of the trapezoid in contact with the vertical surface. By rotating the two end panels further until their top edges contact each other, the apparatus forms a pyramid shape having a hollowed trilateral base and is suitable for display on a horizontal surface. Each panel is comprised of a triangular stretcher to which a linen or cotton canvas is mounted in conventional fashion. Each canvas may be optionally primed with Acrylic gesso or sized and primed with genuine gesso. Mounting hardware is affixed to the back of at least two of the panels. Means for temporarily retaining the apparatus in its pyramid configuration are also described.

There has thus been outlined, rather broadly, the more important components and features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is, therefore, a primary object of the subject invention to provide a multi-panel stretched canvas capable of selective conversion from a 2-dimensional configuration suitable for wall hanging to an intermediate 3-dimensional bas relief-like configuration also suitable for wall hanging, and to a pyramid 3-dimensional configuration suitable for display on a horizontal surface.

It is another primary object of the subject invention to provide a substrate for oil and Acrylic paints for the creation of art which can selectively serve as either wall art or sculpture.

It is also an object of the subject invention to provide a novel support medium for oil painting and the like which will inspire creators of traditional flat art to create works which may be converted into sculpture which must necessarily be viewed through movement of either the work or the observer to appreciate the work as a whole.

Another object of the subject invention is to provide a multi-panel stretched canvas which is relatively simple in design and therefore capable of rapid construction at relatively low costs.

These together with other objects of the invention, along with the various features of novelty which characterize the invention, are pointed out with particularity in the claims annexed to and forming a part of this disclosure. For a better understanding of the invention, its advantages and the specific objects attained by its uses, reference should be had to the accompanying drawings and descriptive matter in which there is illustrated a preferred embodiment of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENT

Figure 1:
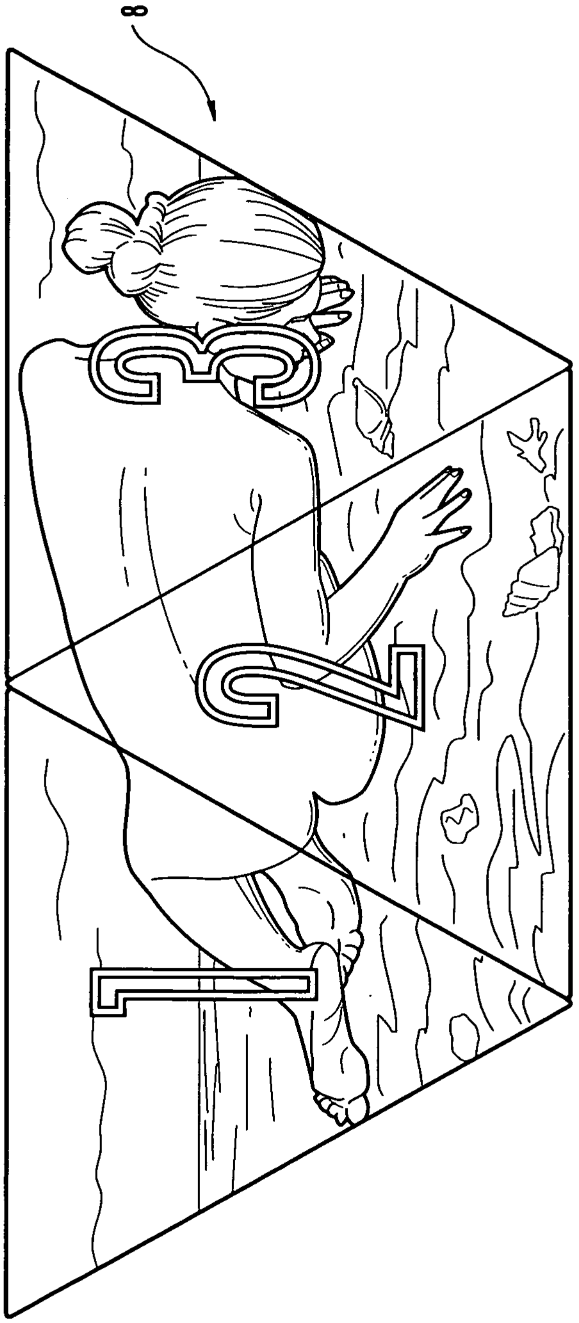
FIG. 1 is a frontal view of the subject convertible stretched canvas in its 2-dimensional configuration.

Reference is first made to FIG. 1 in which there is illustrated in its 2-dimensional planar configuration a front view of the multi-panel stretched canvas designated generally by reference numeral 8, and also referred to herein as a "convertible stretched canvas". The apparatus is comprised of three panels of stretched canvas, each in the shape of an equilateral triangle, which in the planar configuration shown are arranged in an "Apex Down -Apex Up-Apex Down" orientation relative to one another, and joined together in series along abutting sides by pivotable connection means.

Figure 2:
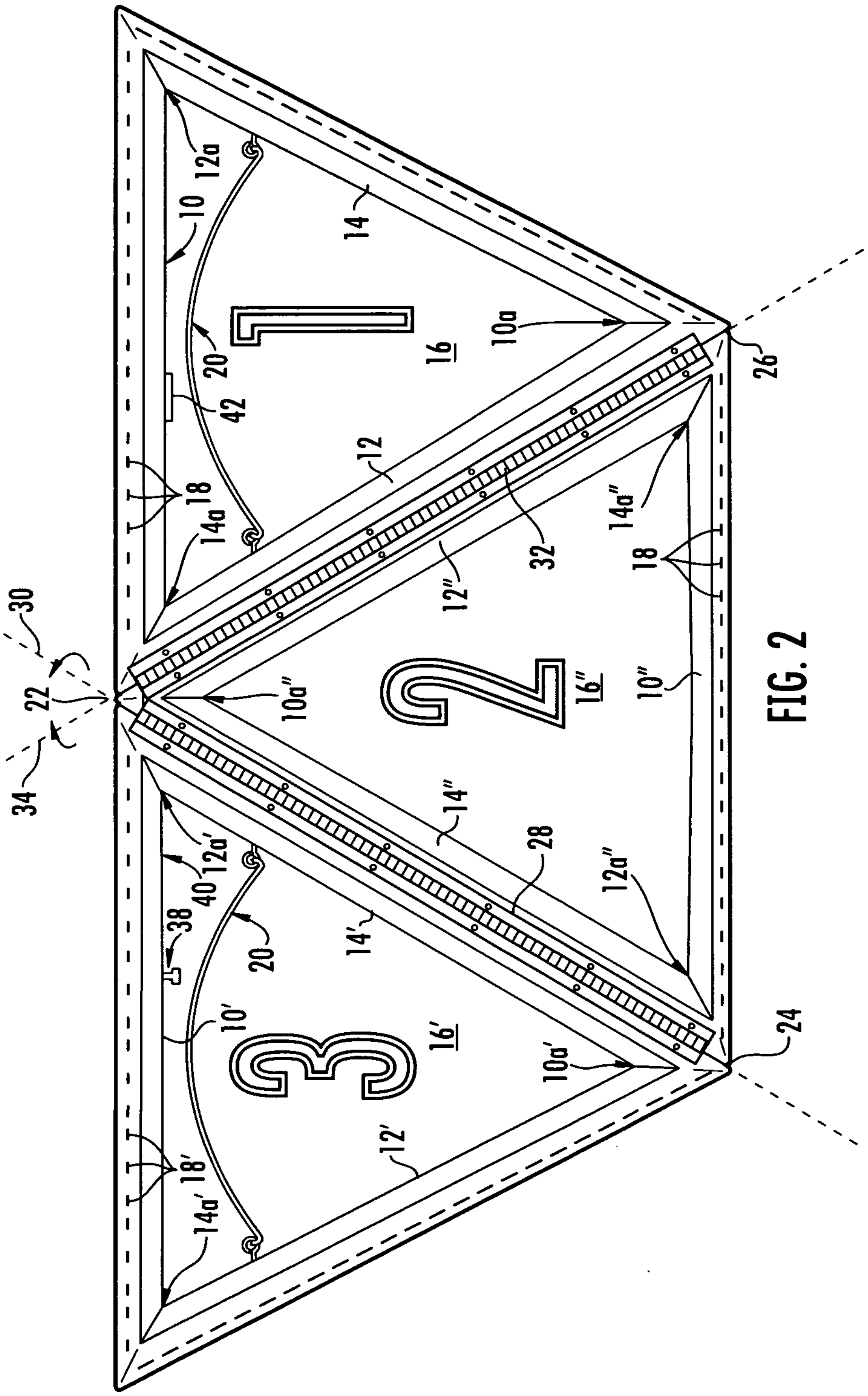
FIG. 2 is a rear view of the invention of FIG. 1.

With reference being made to FIG. 2, a rear view of the subject apparatus in its planar configuration is shown to better illustrate its construction. Each panel 1-3 is comprised of a triangular stretcher frame (also known as a "stretcher") to which a linen or cotton canvas is mounted in conventional fashion. Each stretcher frame may be constructed in a variety of ways, but all involve the connection of three stretcher bars into the desired triangular shape. With reference to panel 1, the stretcher frame is comprised of top stretcher bar 10 opposite a downwardly pointed first apex 10*a*, first side stretcher bar 12 opposite second apex 12*a*, and second side stretcher bar 14 opposite third apex 14*a*. Similarly, the stretcher frame of panel 3 is comprised of top stretcher bar 10' opposite a downwardly pointed first apex 10*a*', first side stretcher bar 12' opposite second apex 12*a*', and second side stretcher bar 14' opposite third apex 14*a*'. Finally, the stretcher frame of panel 3 is comprised of bottom stretcher bar 10" opposite an upwardly pointed first apex 10*a*", first side stretcher bar 12" opposite second apex 12*a*", and second side stretcher bar 14" opposite third apex 14*a*".

Prior to connecting panels 1-3 together, a first sheet of canvas 16 is trimmed to size and stretched across the stretcher frame of panel 1. Similarly, a second sheet of canvas 16' is trimmed to size and stretched across the stretcher frame of panel 3. Finally, a third sheet of canvas 16" is trimmed to size and stretched across the stretcher frame of panel 2. Each canvas sheet 16,16',16" is secured to its corresponding stretcher frame using the desired canvas mounting means which may include, for example, staples 18 or splines (not shown) if the frame is constructed with spline grooves. When fastening the canvas, pressure should be distributed evenly around the stretcher to minimize warping due to unequal distribution of pull. Each canvas may be optionally primed with Acrylic gesso or sized and primed with genuine gesso. Mounting hardware is affixed to the back of at least two of the panels, preferably in the form of conventional picture hanger wire 20 or other suitable means.

As previously stated, the stretcher frames may be constructed in a variety of ways. The differences in construction relate to how the corners are built. Generally the stretcher bars will have interlocking corners that can be fit together like puzzle pieces. Corner supports can also be made using simple woodworking techniques, however. The miter joint is the most popular method of adhering corners on a stretcher, although butt joints are also fine if used in conjunction with gussets. Keys or small triangle wedges (not shown) may be inserted in the joint after stretching the canvas to give the canvas its final tension.

With continued reference to FIG. 2, once each panel 1-3 is constructed as heretofore described, they will be arranged to form the "Apex Down-Apex Up-Apex Down" orientation of the planar configuration shown. More specifically, note that apexes 10*a* and 10*a*' of panels 1 and 3, respectively, each face downwardly whereas apex 10*a*" of panel 2 faces upwardly. When arranged in a 3-2-1 series (viewed left to right), stretching bar 14' is parallel to stretching bar 14" in abutting or near-abutting fashion, stretching bar 12" is parallel to stretching bar 12 in abutting or near-abutting fashion, apexes 12*a*', 10*a*" and 14*a* all converge on a single convergence point 22, apexes 10*a*' and 12*a*" converge on a second convergence point 24, and apexes 14*a*" and 10*a* converge on third convergence point 26. Once arranged in this manner, panel 3 and panel 2 are pivotally connected to one another via connection means preferably but not essentially in the form of first hinge 28 mounted on one side to stretcher bar 14' and on the other side to stretcher bar 14" to form first axis of rotation 30. Similarly, panel 2 and panel 1 are pivotally connected to one another via connection means preferably but not essentially in the form of second hinge 32 mounted on one side to stretcher bar 12" and on the other side to stretcher bar 12 to form second axis of rotation 34. Thusly arranged, panels 1-3 form the desired 2-dimensional planar trapezoid shape which is suitable for display on vertical or substantially vertical surfaces such as a wall or easel. Of course, the apparatus configured in this manner could be mounted to any planar surface given appropriate mounting hardware.

Figure 3:
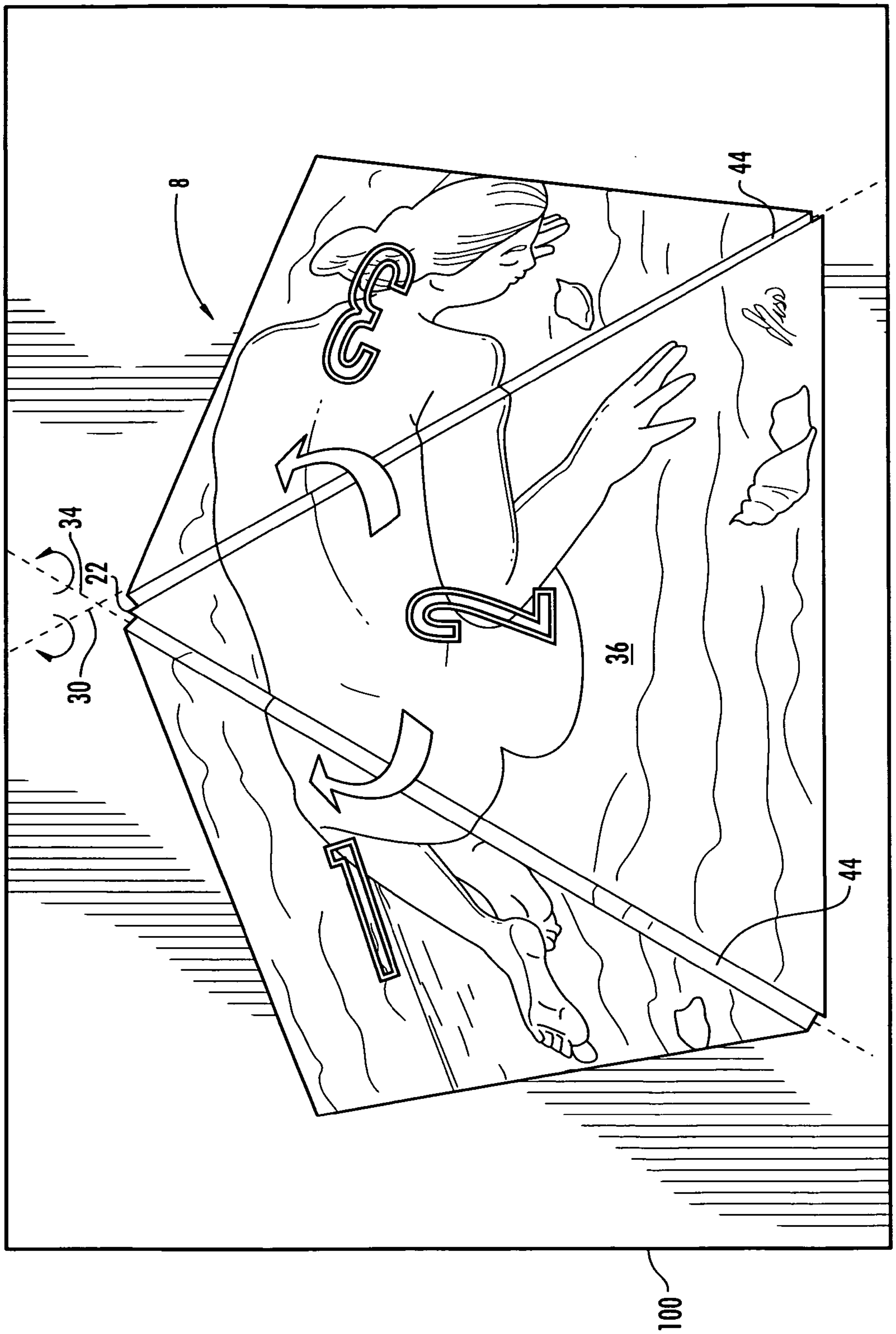
FIG. 3 is a front perspective view of the subject apparatus in its intermediate bas relief-like configuration and mounted to a vertical surface below eye level.
Figure 4:
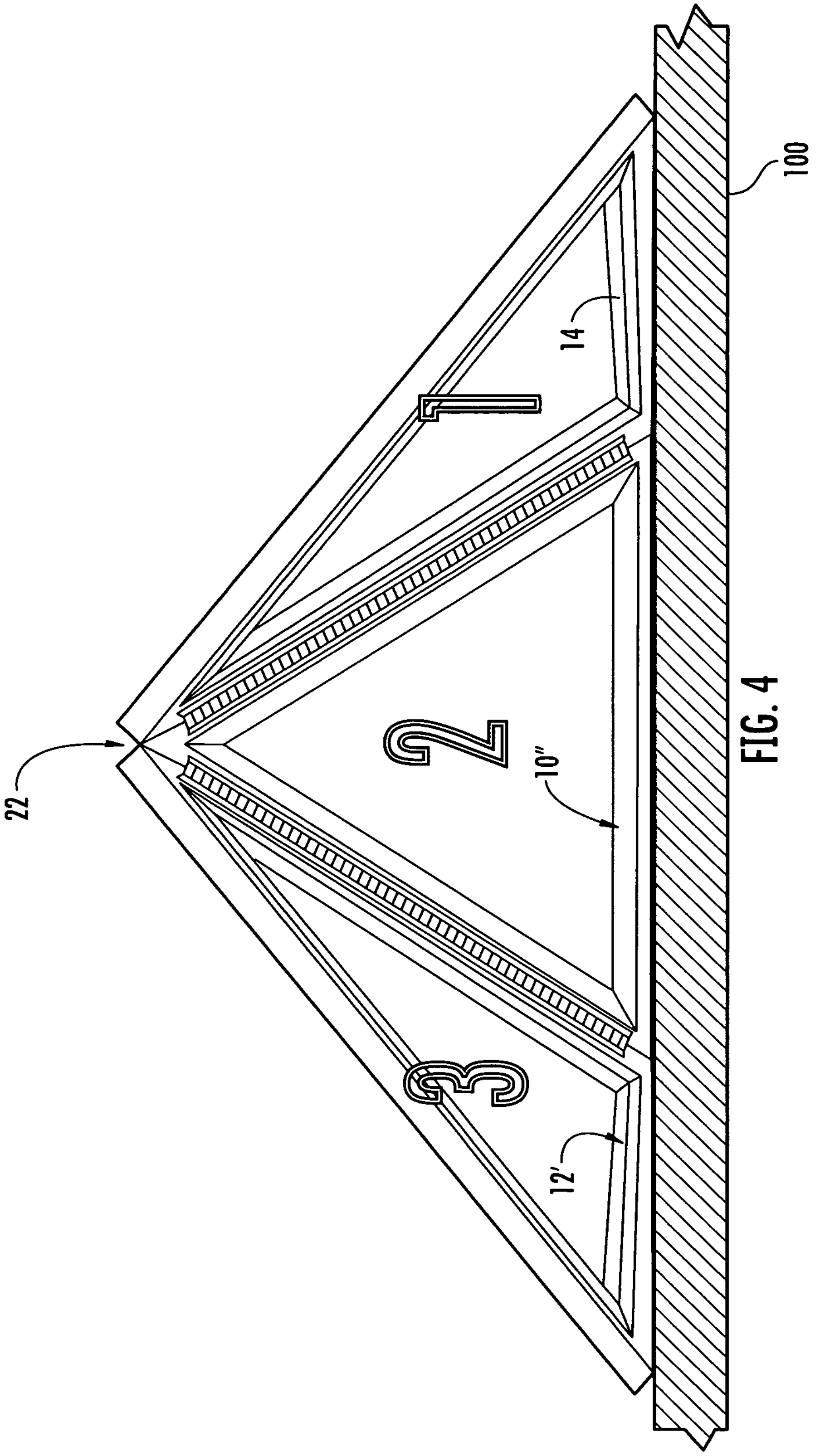
FIG. 4 is a plan view of the invention of FIG. 3.

Reference now being made to FIGS. 3 and 4, frontal and plan views, respectively, of the subject apparatus in its "bas relief-like" configuration may be observed. This configuration is formed by rotating panel 3 about first axis of rotation 30 behind the front surface 36 of panel 2, and similarly rotating panel 1 about second axis of rotation 34 behind said front surface 36 of panel 2 until stretcher bar 12' of panel 3, bottom stretcher bar 10" of panel 2 and stretcher bar 14 of panel 1 all occupy a common plane. Thusly configured, the subject stretched canvas 8 may be mounted to a vertical surface 100 such that stretcher bar 12' of panel 3, bottom stretcher bar 10" of panel 2 and stretcher bar 14 of panel 1 each come into contact with vertical surface 100. Note that stretcher bars that terminate in first convergence point 22 do not contact the wall surface and that a space is created between the rear surfaces of each panel 1-3 and wall 100. This 3-dimensional configuration, therefore, projects from wall 100 in base relief-like fashion.

Figure 5:
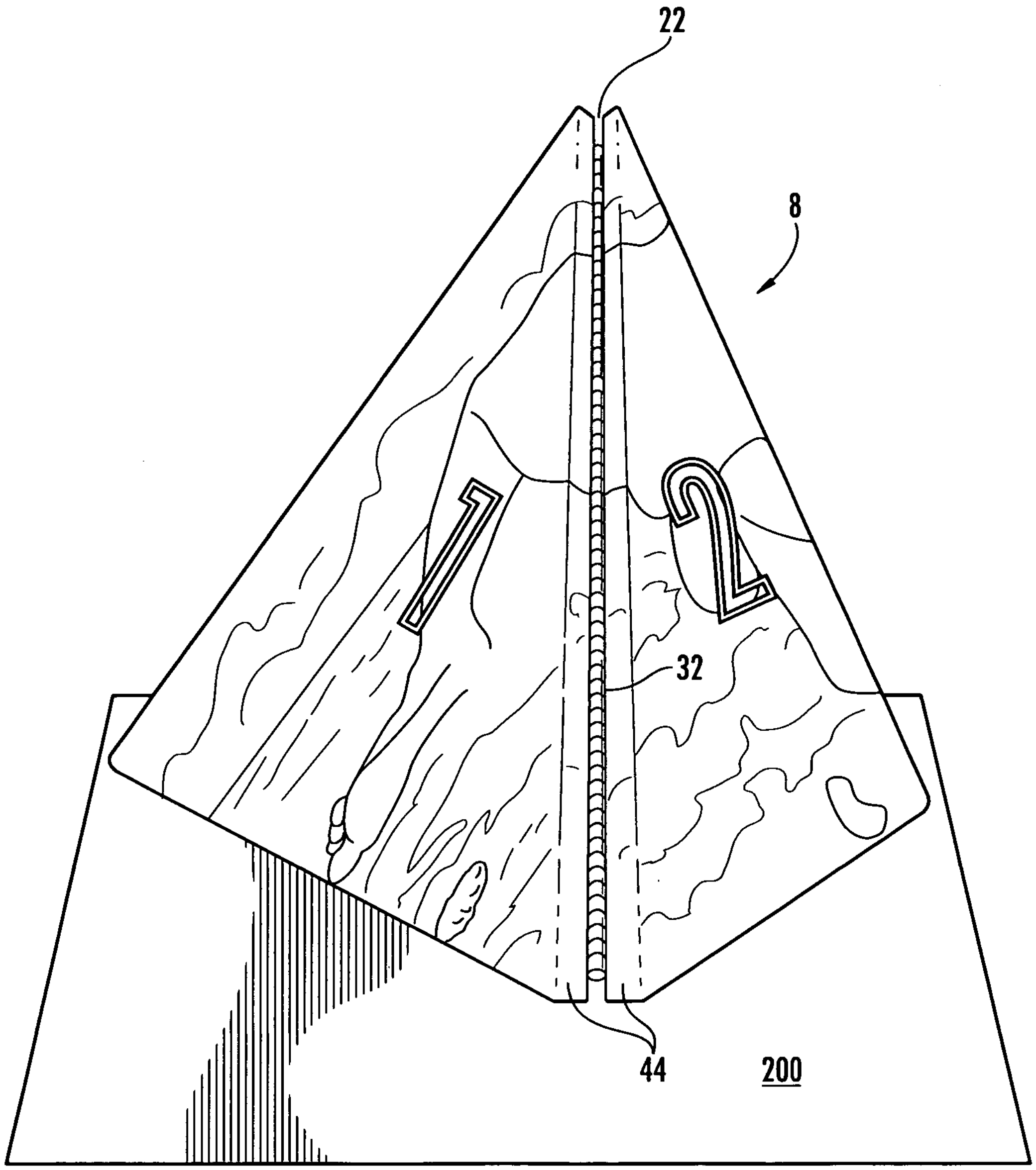
FIG. 5 is a perspective view of the subject apparatus in its 3-dimensional pyramid configuration at rest on a horizontal surface.
Figure 6:
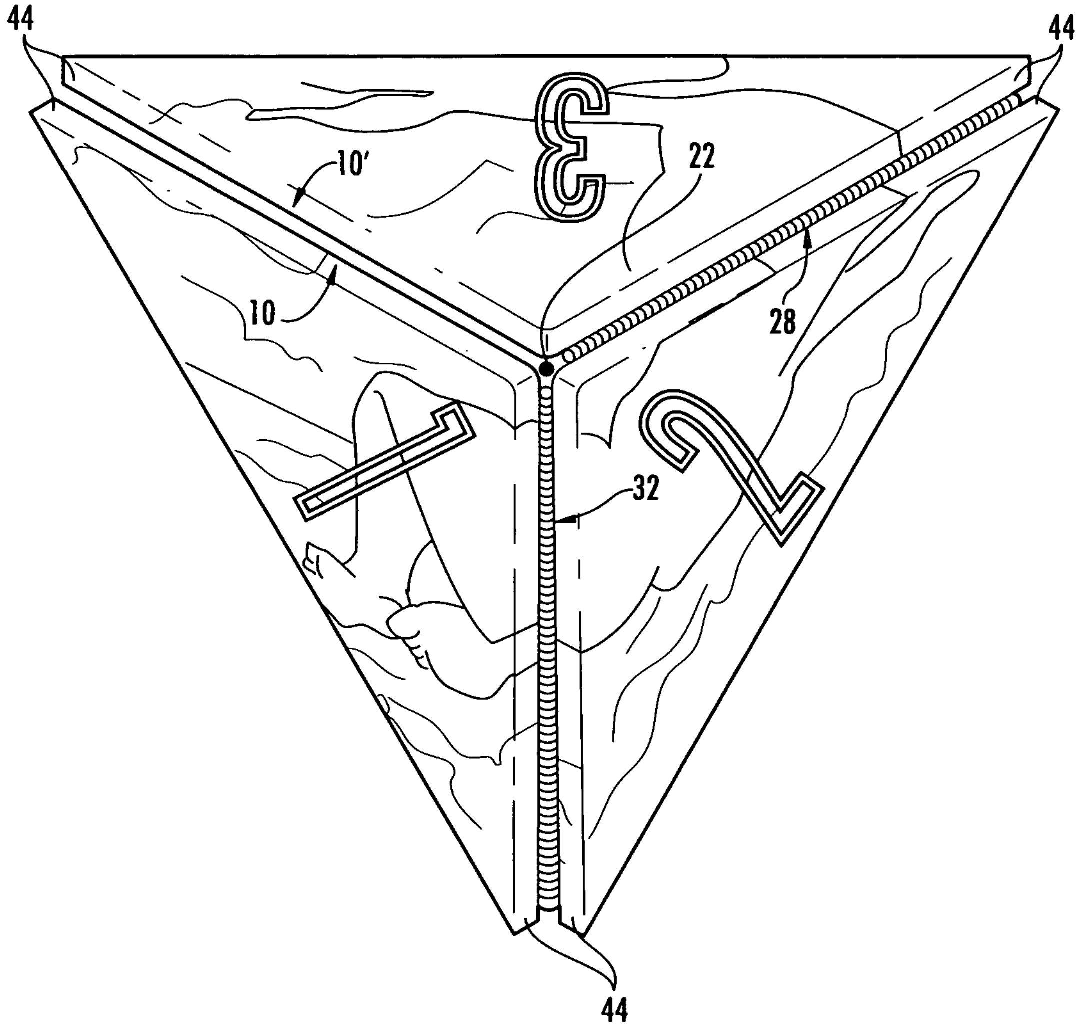
FIG. 6 is a plan view of the invention of FIG. 5.

Reference now being made to FIGS. 5 and 6, side perspective and plan views, respectively, of the subject apparatus in its "pyramid" configuration may be observed. This sculpture-like configuration may more technically be described as a subclass of prismatoids, namely a polyhedron and more specifically a tetrahedron, and is formed by connecting its hollow polygonal base comprised of stretcher bars 12', 10" and 14 with those apexes that converge in first convergence point 22. Each such stretcher bar and first convergence point 22 form an equilateral triangle in the form of panels 1-3. It is a hollow structure. This configuration is formed by rotating panel 3 about first axis of rotation 30 behind the front surface 36 of panel 2, and similarly rotating panel 1 about second axis of rotation 34 behind said front surface 36 of panel 2 until stretcher bar 10 of panel 1 comes into engaging contact with stretcher bar 10' of panel 3 in parallel fashion. Thusly configured, the subject stretched canvas 8 may be displayed on a horizontal surface 200 resting on its above described hollow base.

It may be desirable to temporarily secure abutting stretcher bars 10 and 10' together to stabilize the pyramid structure. To accomplish this, retention means may be provided in a variety of forms. In a preferred embodiment, a pin 38 may extend from the side wall 40 of stretcher bar 10' of panel 3 (FIG. 2) and a cooperating latch 42 may be pivotally mounted to the interior side wall of stretcher bar 10 of panel 1, or vice versa. Latch 42 may then be brought into cooperative engagement with pin 38 after stretcher bars 10 and 10' are brought into abutting or near-abutting relationship to secure the two together. Note that pin 38 and latch 42 are at all times concealed from view and do not obstruct the artwork created on stretched canvas sheets 16, 16' or 16". A length of string may be substituted for latch 42 which may be wound about pin 38 to temporarily secure the subject panels together.

It may be observed that each panel 1-3 has three sides 44 to which canvas is also applied. When the subject apparatus is in its planar configuration (FIG. 1), the sides adjacent to abutting panels are hidden from view. When the apparatus is rotated to its bas relief configuration (FIG. 3) or its pyramid configuration (FIG. 6), however, all sides 44 of the panels are exposed to the viewer. Unlike the sides located about the perimeter of the apparatus as a whole, the sides adjacent to an abutting panel become integral to the image painted on the primary canvas surfaces 36. For this reason it is important that connection means be mounted to the back of each panel rather than to sides 44. Moreover, consideration must be given to the manner in which the sides adjacent an abutting panel are painted because although they are obscured from view in the 2-D configuration, they are prominent in any 3-D configuration. The artist must consider whether and how the subject matter of their painting will be altered in appearance when sides 44 adjacent an abutting panel are exposed and how to account for or take advantage of this "ancillary" canvas space. While challenging, this process can stimulate creativity.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed as being new, useful and desired to be protected by letters Patent of the United States is as follows:

1. An artist canvas for painting having a planar trapezoidal configuration and a pyramid configuration, said planar trapezoidal configuration comprising:

a planar trapezoidal shaped painting surface of paintable canvas, wherein the planar trapezoidal shaped painting is an isosceles trapezoid shape having reflection symmetry, said isosceles trapezoid shape having a longer base and a shorter base connected by a first and second edge of the isosceles trapezoid shape, wherein a center point of the longer base of the isosceles trapezoid shape includes a first separating line extending to a first endpoint of the shorter base, wherein the center point of the longer base of the isosceles trapezoid shape includes a second separating line extending to second endpoint of the shorter base;

said pyramid configuration comprising:

a pyramid shape having three outwardly facing planar surfaces of paintable canvas, wherein an apex of the pyramid shape is the center of the longer base, wherein one base edge of the pyramid shape is the shorter base, wherein the other two base edges of the pyramid shape are the first and second edges of the isosceles trapezoid shape, said artistic canvas further comprising:

a first triangular canvas panel;

a second triangular canvas panel having a first side adjacent to a side of said first triangular canvas panel; said first and second panels being pivotally connected; and a third triangular canvas panel having a first side adjacent to a second side of said second triangular canvas panel; said second and third panels being pivotally connected.

2. The artist canvas of claim 1 wherein said first and second panels are pivotally connected by a first hinge, and said second and third panels are pivotally connected by a second hinge.

3. The artist canvas of claim 2 wherein said first hinge is mounted to the rear surface of said first and second panels, and said second hinge is mounted to the rear surface of said second and said third panels.

4. The artist canvas of claim 1, wherein the longer base is the top of the artist canvas when presented in the planar trapezoidal configuration, and wherein the shorter base is a bottom when presented in the planar trapezoidal configuration.

5. The artist canvas of claim 1, wherein a backside of the artistic painting opposite the artistic image comprises a first hinge along the first separating line and a second hinge along the second separating line.

6. The artist canvas of claim 1, wherein the planar trapezoidal shaped planar surface comprises three triangular panels joined together along a backside of the artistic painting opposite of the artistic image, wherein edges of the triangular panels comprise the first separating line the second separating line, and the first and second edge, the shorter base, first half of the longer base, and a second half of the longer base.

7. A painting having a planar trapezoidal configuration and a pyramid configuration said planar trapezoidal configuration comprising:

a planar trapezoidal shaped painting surface presenting an artistic image, wherein the planar trapezoidal shaped painting is an isosceles trapezoid shape having reflection symmetry, said isosceles trapezoid shape having a longer base and a shorter base connected by a first and second edge of the isosceles trapezoid shape, wherein a center point of the longer base of the isosceles trapezoid shape includes a first separating line extending to a first endpoint of the shorter base, wherein the center point of the longer base of the isosceles trapezoid shape includes a second separating line extending to second endpoint of the shorter base, said pyramid configuration comprising:

a pyramid shape having three outwardly facing planar surfaces, wherein a third portion of the artistic image is presented on each of the three outwardly facing planar surfaces, wherein an apex of the pyramid shape is the center of the longer base, wherein one base edge of the pyramid shape is the shorter base, wherein the other two base edges of the pyramid shape are the first and second edges of the isosceles trapezoid shape, said painting further comprising:

a first triangular canvas panel having three sides, a front surface and a rear surface;

a second triangular canvas panel having three sides, a front surface and a rear surface; said first and second panels being pivotally connected;

a third triangular canvas panel having three sides, a front surface and a rear surface; said second and third panels being pivotally connected.

8. The painting of claim 7 wherein said first and second panels are pivotally connected by a first hinge, and said second and third panels are pivotally connected by a second hinge.

9. The painting of claim 8 wherein said first hinge is mounted to said rear surface of said first and second panels, and said second hinge is mounted to said rear surface of said second and said third panels.

10. The painting of claim 9, wherein said first, second and third triangular canvas panels are each shaped like equilateral triangles.

11. The painting of claim 8, wherein said first, second and third triangular canvas panels are each shaped like equilateral triangles.

12. The painting of claim 7, wherein said first, second and third triangular canvas panels are each shaped like equilateral triangles.

13. The painting of claim 7, wherein the longer base is the top of the artist canvas when presented in the planar trapezoidal configuration, and wherein the shorter base is a bottom when presented in the planar trapezoidal configuration.

14. The painting of claim 7, wherein a backside of the artistic painting opposite the artistic image comprises a first hinge along the first separating line and a second hinge along the second separating line.

15. The painting of claim 7, wherein the planar trapezoidal shaped planar surface comprises three triangular panels joined together along a backside of the artistic painting opposite of the artistic image, wherein edges of the triangular panels comprise the first separating line the second separating line, and the first and second edge, the shorter base, first half of the longer base, and a second half of the longer base.

16. A painting comprising:

an artistic painting having a planar trapezoidal configuration and a pyramid configuration, said artistic painting in the planar trapezoidal configuration comprising:

a planar trapezoidal shaped painting surface presenting an artistic image, wherein the planar trapezoidal shaped painting is an isosceles trapezoid shape having reflection symmetry, said isosceles trapezoid shape having a longer base and a shorter base connected by a first and second edge of the isosceles trapezoid shape, wherein a center point of the longer base of the isosceles trapezoid shape includes a first separating line extending to a first endpoint of the shorter base, wherein the center point of the longer base of the isosceles trapezoid shape includes a second separating line extending to second endpoint of the shorter base, said artistic painting in the pyramid configuration comprising:

a pyramid shape having three outwardly facing planar surfaces, wherein a third portion of the artistic image is presented on each of the three outwardly facing planar surfaces, wherein an apex of the pyramid shape is the center of the longer base, wherein one base edge of the pyramid shape is the shorter base, wherein the other two base edges of the pyramid shape are the first and second edges of the isosceles trapezoid shape.

17. The painting of claim 16, wherein the longer base is the top of the artistic painting when presented in the planar trapezoidal configuration, and wherein the shorter base is a bottom of the artistic painting when presented in the planar trapezoidal configuration.

18. The painting of claim 16, wherein a backside of the artistic painting opposite the artistic image comprises a first hinge along the first separating line and a second hinge along the second separating line.

19. The painting of claim 16, wherein the artistic image is painted on a canvas material.

20. The painting of claim 16, wherein the planar trapezoidal shaped planar surface comprises three triangular panels joined together along a backside of the artistic painting opposite of the artistic image, wherein edges of the triangular panels comprise the first separating line the second separating line, and the first and second edge, the shorter base, first half of the longer base, and a second half of the longer base.

* * * * *